Jan. 2, 1934.       J. A. PILCHER       1,941,486
AUXILIARY LATERAL JOURNAL BEARING
Filed Jan. 14, 1931
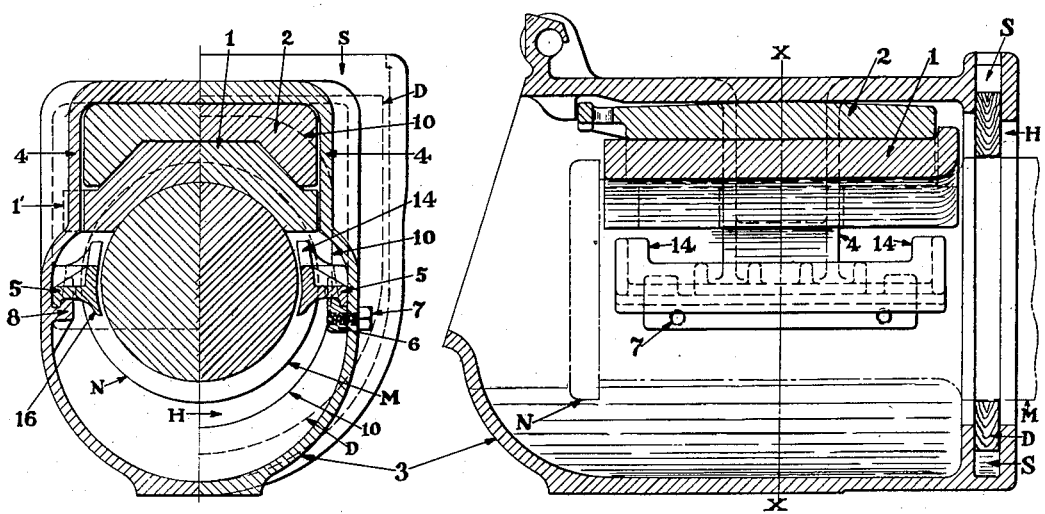
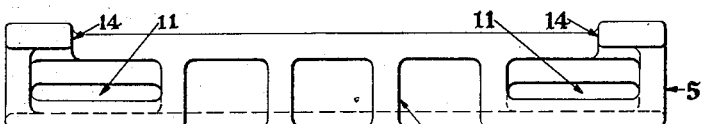
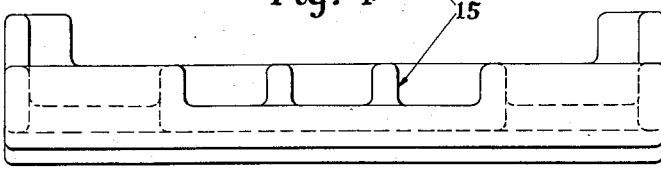  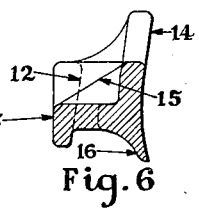
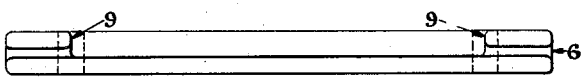
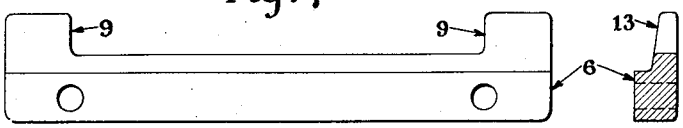  
INVENTOR.
John A. Pilcher.

Patented Jan. 2, 1934

1,941,486

UNITED STATES PATENT OFFICE 1,941,486

AUXILIARY LATERAL JOURNAL BEARING

John A. Pilcher, Roanoke, Va., assignor to Western Railway Equipment Company, St. Louis, Mo., a corporation of Missouri Application January 14, 1931. Serial No. 508,604

4 Claims. (Cl. 308—40)

My invention relates to improvements in the well-known journal or oil box of railway vehicles by the addition of a readily removable auxiliary bearing on each side of the axle journal to prevent any harmful movement of the journal in its bearing from the inertia of the wheels and axle with the impact of the cars, one against the other, and from any severe action of the brakes in conjunction with the inertia of the car while being retarded.

It also keeps the waste in the lower portion of the box from inserting itself between the edge of the bearing and its journal.

In the drawing, Figure 1, represents a section of the ordinary railroad journal box on its longitudinal center line coinciding with the center of the journal. There is shown a dotted outline of the journal.

Figure 2 is a half section taken on the line X—X of Figure 1.

Figure 3 is a view similar to Figure 2 but looking in the opposite direction and showing a modification.

Figures 4, 5 and 6 show the auxiliary lateral bearing in plan, elevation and cross-section, respectively.

Figures 7, 8 and 9 show the auxiliary lateral bearing keeper separate from the box, as represented in the half cross-section, Figure 2, in plan, elevation and cross-section, respectively.

In Figure 1, 1 is the regular journal bearing, and 2, is the regular journal wedge holding the journal bearing from moving outward in the journal box 3.

The journal box 3, is regularly fitted with internal projections 4, on each side, which fit snugly against the sides of the wedge 2, and the journal brass 1, on each side, holding them in place and at the same time becoming the stop against which the brass lugs 1', strike to limit the inward movement of the brass 1, in the box 3.

The auxiliary lateral bearing 5, is shown in detail in Figures 4, 5 and 6. The auxiliary lateral bearings 5, are supported in the journal box 3, by the auxiliary bearing keeper 6, which is shown in detail in Figures 7, 8 and 9.

The auxiliary lateral bearing keeper is attached to the journal box by the bolts 7, and in this manner the auxiliary lateral side bearing 5, can be applied to existing journal boxes. For new journal boxes in connection with which the auxiliary lateral bearing 5, is to be used, the keeper can be made integral with the box, as shown at 8, in Figure 3. The part of the box 8, in Figure 3, is shaped similar to part 9, of the keeper 6, and will support the auxiliary lateral bearing 5, in exactly the same manner as the auxiliary lateral bearing keeper 6.

In the regular well-known railway journal box, there is a hole on the inside end of the box, marked H, larger in every direction than the near portion of the axle at the point M, and of the collar N. This is so the axle journal can be easily entered in the journal box and the axle will not normally rub the box. The part of the axle at M fits into a dust guard D, which, while fitting the periphery of the axle snugly, is free to move vertically to a limited extent in the slot S of the journal box 3. The opening in the inside end of the journal box 3, is shown by the line 10, in Figure 2, to be larger in every direction than the near portion of the axle at M, just inside of the journal, and of the collar at N.

It will be noted from the drawing, Figure 2, that the portion of the axle M, with sufficient movement of the journal relative to the bearing 1, from impact, etc., will strike the side 10, of the opening H, in the inside end of the journal box 3, before the collar N will strike the inside of the journal box at the nearest point.

Experiments and practice have demonstrated the fact that under certain conditions of operation, such as a severe impact of cars, or the hard setting of the brake while the car is moving, and where there is no auxiliary lateral bearing 5, as shown in Figures 2 and 3, the journal will be forced out of its seat in the bearing 1, and will move until the part of the axle at M, comes in contact with the side of the opening H, on the inside of the journal box at 10. This relative displacement of the journal in its bearing allows the waste with which the bottom portion of the journal box is packed, to work its way up into the opening, thus made between the journal and its brass. Upon the return of the journal to its seat in the brass, some of the waste is often caught and this may cause the journal to run hot, even though there is an abundance of oil in the waste in the lower portion of the journal box and the waste is in contact with the journal.

The auxiliary lateral bearing 5, has in it slots 11, with a taper on the sides at 12, which fits against a corresponding taper on the keeper 6, at 13. This makes the placing of the auxiliary lateral bearing on its keeper easy and allows it to be put snugly in place so it will not droop toward the journal and rub against it. The auxiliary lateral bearings are so placed that when the journal is normally in its brass, these auxiliary bearings will clear the journal by a small amount so as not to drag, but will prevent the displacement of the journal in its brass to a harmful amount. It can be readily seen that the use of this auxiliary lateral bearing in connection with the regular standard journal and journal box will prevent excess movement of the journal in its brass, will keep the waste in the bottom portion of the journal box from getting to the edge of the brass, and will keep the portion of the axle M, away from the edge of the opening H, where such movement often catches and crushes the sides of the snugly-fitted dust guard D.

The slots 11, in the auxiliary lateral bearing 5, are made much longer than the width of the lug 9, on the keeper 6, or of the keeper portion of the journal box 3, so that when the journal moves in the direction of its axis in the box, it will have its collar N, or its enlarged portion M, bearing against the end of its brass 1, before it can bind either of these portions of the axle against either end of the auxiliary lateral bearing 5, and cause trouble.

The central portion of the auxiliary lateral bearing 5, is shaped in such manner, as by cutting away of ribs 15, that when the journal box is jacked up, in the usual manner for placing and removing the wedge 2, and the bearing 1, the auxiliary lateral bearing 5, can be readily placed, just before the placing of the bearing 1, without interfering with the interior projection 4, of the journal box 3.

It can be seen from observation that the journal can be inserted in the journal box when there is no brass, or bearing wedge, and no auxiliary lateral bearing in place. It can also be seen that the auxiliary lateral bearings can, while the box is jacked up relative to its journal, be inserted in the box over the top of the journal and its collar N, and slid down to its keeper where it will rest close to the journal between the collar N, and the portion of the axle at M. The auxiliary lateral bearing is held snugly to the sides of the box by contact of the tapered surfaces 12 and 13, on the auxiliary bearing and its keeper, respectively. After this auxiliary lateral bearing 5, is in place on the keeper, the brass 1, and the wedge 2, can be put in place and the box lowered so the load will rest properly on the journal in the usual manner. The auxiliary lateral bearing 5, is provided with projecting lugs 14, so that when the parts are normally in place, reach nearly to the bottom portion of the brass 1. This is to prevent any vertical movement of the auxiliary lateral bearing that will lift it out of the seats in its keeper by any forces present when it is in contact with the journal from impact or otherwise. At the same time the space is allowed between the bearing 1, and the lugs 14, on the auxiliary bearing 5, so that with any normal variation in depth, the bearing 1, will not at any time rest on the auxiliary bearing 5, but on the journal. The space between the brass 1, and the lugs 14, on the auxiliary bearing 5, is also made sufficient in jacking up the box that the wedge and bearing can be removed.

While the drawing shows slots like 11, in the auxiliary lateral bearing 5, and corresponding lugs 9, on the keeper 6, and lugs 8, made integral with the box 3, these can be reversed and the slots placed in the keeper or made integral with the box and have corresponding lugs on the auxiliary lateral bearing to drop into them and the results will be the same.

The bottom portion of the auxiliary side bearings 5, at the surface next the journal, as shown at 16, is made practically wedge-shaped so as to wedge any rising waste away from the journal at the point where there is normally the necessary crack between the journal and the auxiliary side bearing, thus reducing to a minimum any tendency to drag the waste by the stop and on to the point of contact of the journal and the bearing.

Having as above described my invention and its purposes, I claim:

1. The combination with a journal box, of an axle positioned therein and provided with a reduced bearing surface situated between the unreduced body of the axle and a projecting end collar, a brass in said journal box and contacting with the upper part of the axle bearing surface, a keeper on the box walls, and an auxiliary bearing member adapted to be engaged with said keeper by a downward movement while the axle is in position in the box, said auxiliary bearing member extending between the body of the axle and the collar to limit the relative lateral movement of the axle and box.

2. The combination with a journal box, of an axle positioned therein and provided with a reduced bearing surface situated between the unreduced body of the axle and a projecting end collar, a brass in said journal box and contacting with the upper part of the axle bearing surface, a keeper on the box walls, and an auxiliary bearing member adapted to be engaged with said keeper by a downward movement while the axle is in position in the box, said auxiliary bearing member extending between the body of the axle and the collar to limit the relative lateral movement of the axle and box, said auxiliary bearing member having stops adjacent the brass to prevent disengagement of the bearing members and keepers when the brass is in position.

3. The combination with a journal box, of an axle positioned therein and provided with a reduced bearing surface situated between the unreduced body of the axle and a projecting end collar, a brass in said journal box and contacting with the upper part of the axle bearing surface, and a keeper and cooperating auxiliary bearing member carried on the box wall, one of said cooperating parts being provided with a slot and the other with a lug, said slot and lug being engageable by a downward movement of the auxiliary bearing member while the axle is in position in the box, said auxiliary bearing member extending between the body of the axle and the collar to limit the relative lateral movement of the box and axle.

4. The combination with a journal box, of an axle positioned therein and provided with a reduced bearing surface situated between the unreduced body of the axle and a projecting end collar, a brass in said journal box and contacting with the upper part of the axle bearing surface, and a keeper and cooperating auxiliary bearing member carried on the box wall, one of said cooperating parts being provided with a slot and the other with a lug, said slot and lug being engageable by a downward movement of the auxiliary bearing member while the axle is in position in the box, said slot being longer than said lug to permit longitudinal movement of the auxiliary bearing member relative to the keeper, said auxiliary bearing member extending between the body of the axle and the collar to limit the relative lateral movement of the box and axle.

JOHN A. PILCHER.